Feb. 4, 1936. W. S. DRIGGERS 2,029,989

FLYCATCHER

Filed Aug. 27, 1934

W. S. Driggers
INVENTOR

BY Victor J. Evans & Co.
ATTORNEY

Patented Feb. 4, 1936

2,029,989

UNITED STATES PATENT OFFICE 2,029,989

FLYCATCHER

William S. Driggers, Bostwick, Fla., assignor of one-half to R. J. Hancock, Palatka, Fla.

Application August 27, 1934, Serial No. 741,669

3 Claims. (Cl. 43—122)

The invention relates to a fly catcher and more especially to a fly trap and exterminator.

The primary object of the invention is the provision of a trap of this character, wherein by its construction, flies can be caught thereby, so as to enable extermination of the same after the trapping, the flies being enticed by bait and light, the trap being of novel construction so that if desired the catchings thereof can be readily inspected for any purpose.

Another object of the invention is the provision of a trap of this character, wherein the same is freely accessible so that it can be readily and easily cleaned to render it sanitary and when set up for use will avoid any possibility of escape of flies or other insects as trapped thereby.

A further object of the invention is the provision of a trap of this character which is extremely simple in construction, thoroughly reliable and efficient in its purpose, light in weight, yet strong, durable, portable, and inexpensive to manufacture.

With these and other objects in view, the invention consists in the feature of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
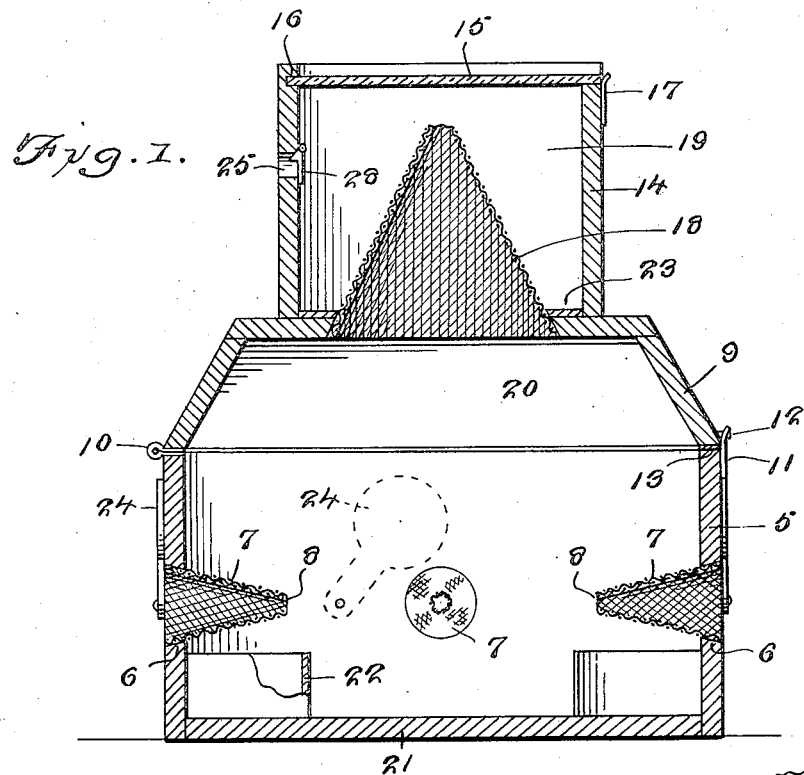
Figure 1 is a vertical sectional view through a trap constructed in accordance with the invention.
Figure 2:
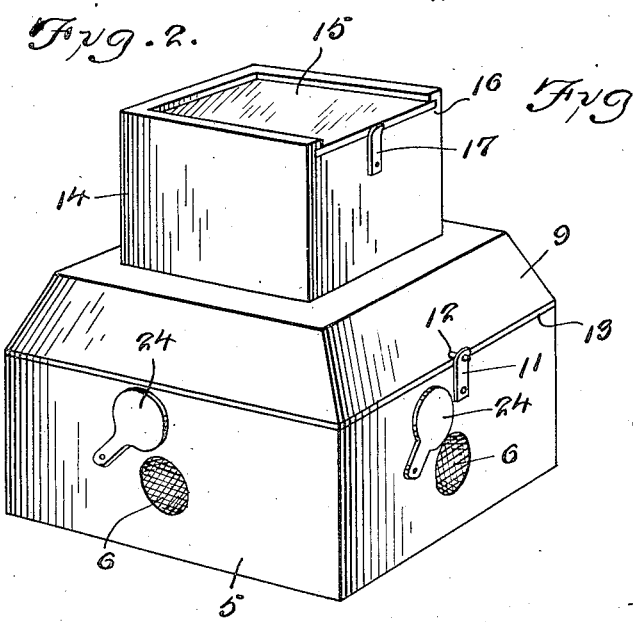
Figure 2 is a perspective view thereof.

Referring to the drawing in detail, the trap comprises a box-like body 5, preferably made from wood, and in opposite sides of the same are provided, midway thereof, openings 6 having fitted therein inwardly tapered or conical-shaped reticulated entrance members 7, these being truncated at their smaller ends, as at 8, so that flies when passing therethrough to the interior of the body 5 will be deprived of an exit therethrough or allowed to escape due to the contracted inner open end of these members 7.

Carried upon the open top of the body 5 is a beveled edged lid or cover 9, it being swingingly supported by hinges 10 connecting the same to the body, so that on the opening of the lid or cover, access may be had to the interior of the body. The body exteriorly thereof carries a spring latch 11 for engaging a keeper 12 on the lid or cover, so that the latter can be latched in closing position. It is desirable to have the lid or cover 9 at the edge meeting the body 5 provided with a sealing gasket 13 so that a closed joint will be had when the lid or cover is in closing position with respect to the body.

Superimposed upon the top flat portion of the lid or cover 9 is a trapping hood 14 carrying a slidable glass panel 15, this being fitted in guide grooves 16 in the hood and such panel functioning to close the top of such hood and also providing a light admitting glass, the panel 15 being held in closing position through the medium of a latch 17.

Arranged centrally of the top of the cover or lid 9 is a truncated conical-shaped foraminous entrance piece 18, it rising within the hood 14 and through which flies from the body 5 pass into the trapping chamber 19 as constituted by said hood. The body 5 with the lid or cover 9 also constitutes a trapping chamber 20 beneath the chamber 19.

Adapted to be placed within the body 5 upon its bottom 21 are bait holders 22 for the reception of enticing bait to attract flies within the chamber 20 of the trap.

The light as transmitted through the panel 15 to the chamber 19 will attract flies from the chamber 20 to the chamber 19. These flies can be exterminated by sulphur fumes or other exterminating material.

There is also fitted about the piece 18 a sun rays reflector plate 23 which under the rays of light will function to kill flies by reflected heat from the sun rays as may be created within the chamber 19.

Fitted to the sides of the body 5 at the outer faces thereof are swinging closures 24 for the openings 6.

Figure 3:
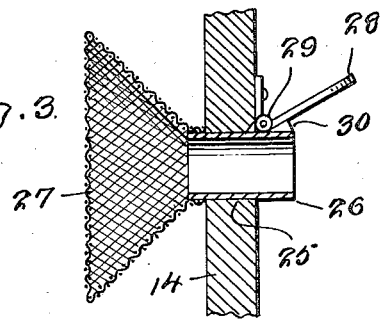
Figure 3 is a fragmentary vertical sectional view showing an inspection contrivance for use with the trap.
Figure 4:
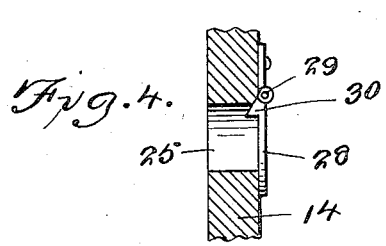
Figure 4 is a view similar to Figure 3 with the contrivance detached.

Provided in one side wall of the hood 14 is a hole 25 for the fitting therein of an inspection contrivance which includes a tube 26 having a conical-shaped reticulated trapping head 27 whereby flies caught therein may be confined as specimen from those within the chamber 19, whence they can be visually inspected. This hole 25 is closed by a hinged closure member 28, the same being hinged at 29 to the inner face of the hood at the hole 25 and it is formed with a beveled projection 30 for engaging the tube 26 of the contrivance having the head 27, so that on inserting this tube 26 in the hole, the closure member 28 will be automatically shifted or opened to the position as shown in Figure 3 of the drawing.

By the arrangement of the members 7 and the piece 18, the escape of flies from the trap is prevented.

What is claimed is:

1. A trap of the kind described, comprising a hollow body having a vertically swinging lid forming a cover thereto, a dome rising from the lid and having a transparent top panel separably fitted therewith, reticulated entrance cones fitted in the sides of the body and in the lid for the passage of flies from without the body inwardly thereof and upwardly into the dome and a sun rays' reflector concentrically about the cones fitting the lid and at the bottom of the dome interiorly thereof.

2. A trap of the kind described, comprising a hollow body having a vertically swinging lid forming a cover thereto, a dome rising from the lid and having a transparent top panel separably fitted therewith, reticulated entrance cones fitted in the sides of the body and in the lid for the passage of flies from without the body inwardly thereof and upwardly into the dome, a sun rays' reflector concentrically about the cone fitting the lid and at the bottom of the dome interiorly thereof and a specimen trap releasably fitting the dome at one side thereof for communication therewith.

3. A trap of the kind described, comprising a hollow body having a vertically swinging lid forming a cover thereto, a dome rising from the lid and having a transparent top panel separably fitted therewith, reticulated entrance cones fitted in the sides of the body and in the lid for the passage of flies from without the body inwardly thereof and upwardly into the dome, a sun rays' reflector concentrically about the cone fitting the lid and at the bottom of the dome interiorly thereof, a specimen trap releasably fitting the dome at one side thereof for communication therewith and a gate located at the point of separable connection of the specimen trap with the dome and open on the fitting thereof with the dome and closed on the separation of said trap from the dome.

WILLIAM S. DRIGGERS.